Aug. 8, 1967  R. B. SPOKAS  3,334,716
FRICTION CLUTCH
Filed Nov. 26, 1965  3 Sheets-Sheet 1

INVENTOR
ROMAS B. SPOKAS
BY Joseph W. Malleck
ATTY.

Aug. 8, 1967   R. B. SPOKAS   3,334,716
FRICTION CLUTCH
Filed Nov. 26, 1965   3 Sheets-Sheet 2

INVENTOR
ROMAS B. SPOKAS
BY
Joseph W. Malleck
ATTY

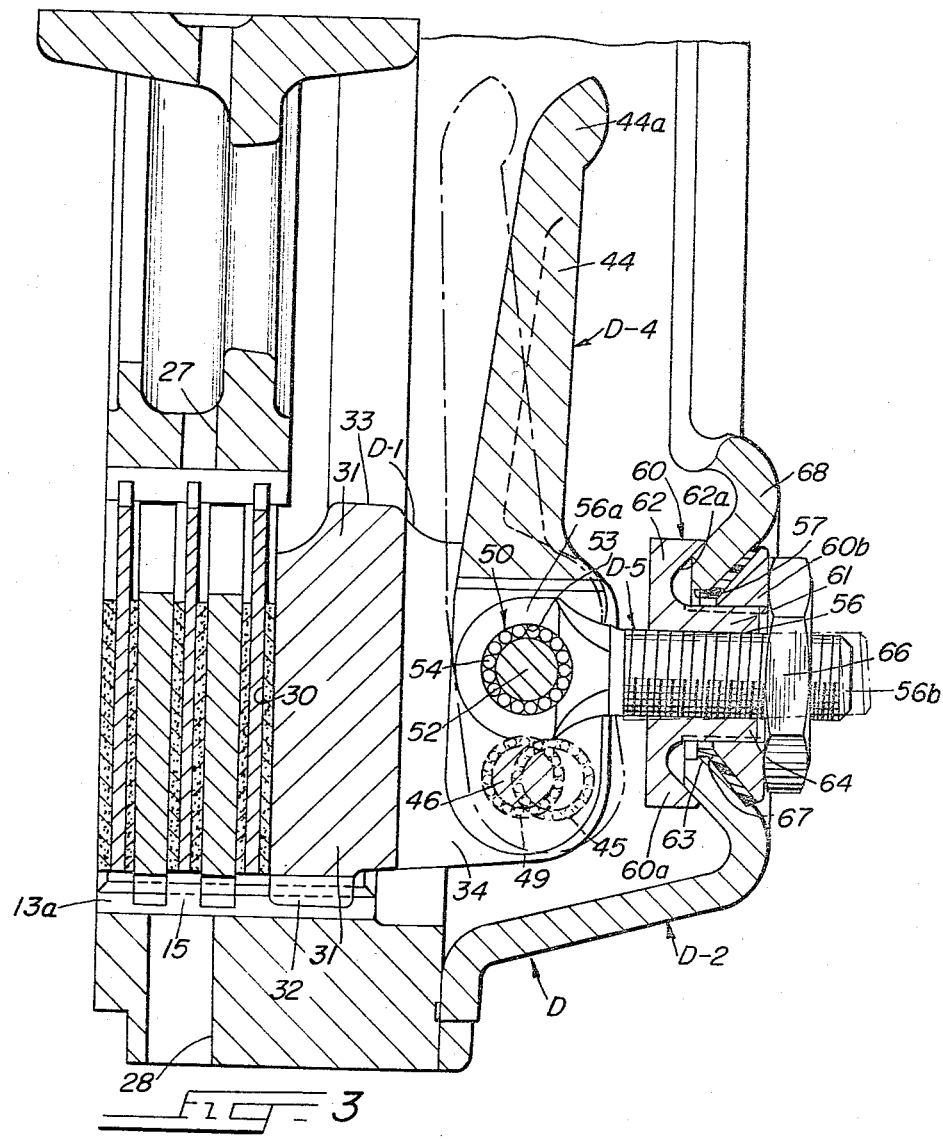

United States Patent Office 3,334,716
Patented Aug. 8, 1967

3,334,716
FRICTION CLUTCH
Romas B. Spokas, Rockford, Ill., assignor to Borg-Warner Corporation, a corporation of Illinois
Filed Nov. 26, 1965, Ser. No. 509,736
5 Claims. (Cl. 192—69)

ABSTRACT OF THE DISCLOSURE

A clutch of the multiple disc type having an axially movable pressure plate for engaging, the pressure element being selectively disengaged by a plurality of release levers, each having an outer extremity connected to the pressure plate by an anti-friction connection and intermediate portion pivotally mounted on a reaction or cover plate for the clutch. The cover plate mounting comprises an eye-bolt having an inner end adapted to carry an anti-friction bearing connection for the lever and an opposite end carrying a semispherical male element adapted to seat on an exterior side of the cover plate and against a complementary female socket therein.

---

This invention relates to a disc-type friction device and more particularly to an actuating assembly for such devices employing a lever system operative between a pressure element and a reaction plate, the latter both being drivingly associated with a rotary input means of the device.

Clutches of the above type have been typically used for automotive purposes. In more heavy duty applications, such as trucks, the clutches may be adapted with a multiple number of friction plates or facings requiring a relatively greater degree of axial travel of the pressure element to achieve complete clutch engagement. It is desirable in such applications, where the friction plate loads become considerably higher in order to transmit the design torque, to employ roller bearings at the pivotal connections of the lever respectively with lugs of the pressure element and with a typical eye-bolt carried by the reaction or cover plate. However, roller bearings, which require a fixed mounting axis relative to the lever, can only be successfully utilized where the lever pivot or fulcrum is free to shift thereby enabling the lever to undergo a slightly compound movement.

It is therefore, a primary object of this invention to provide a clutch of the heavy duty type which incorporates an improved actuating assembly thereby making it possible to incorporate the advantages of roller bearings while maintaining a simple construction.

Another object of this invention is to provide a friction device having a plurality of friction elements drivingly associated with each of the rotary input means and rotary output means, thereby requiring a greater degree of axial travel of a pressure element to achieve complete clutch engagement, the clutch being of the normally spring engaged type and employing a lever system having spaced needle bearing journals, one journal being associated with lugs extending from the pressure element, and the other journal being associated with the cover plate in a manner to permit the lever to pivot about the lug journal while slightly pivoting about said other journal and thereby undergoing a slight compound movement. A specific structural feature pursuant to this object is the employment of a unique mounting for one end of a link interconnecting said other journal of the lever with the cover plate, the mounting comprising a pair of complementary shaped male elements which are inter-screwed together and effective to engage opposite surfaces of a female socket portion defined in a sheet metal cover plate. The contour of the mating surfaces of the respective male and female elements provide a means of rocking the link relative to the cover plate while maintaining a high degree of durability.

Another object of this invention is to provide a heavy duty clutch of the above type incorporating an anti-friction insert between the mating surfaces of the male and female elements defining the rockable link mounting on the cover plate, the insert having a composition of the class materials including Teflon.

Still another object of this invention is to provide a friction device of the heavy duty type which employs the advantages of the previous objects while at the same time improving the anti-deflection characteristics of a sheet metal cover plate which is normally used with this type of device.

Other objects and advantages of this invention will become more apparent from the following detailed description taken in connection with the accompanying drawings in which:

FIGURE 3 is enlarged sectional view of a portion of the actuating assembly and illustrating different operative conditions thereof.

Figure 1:
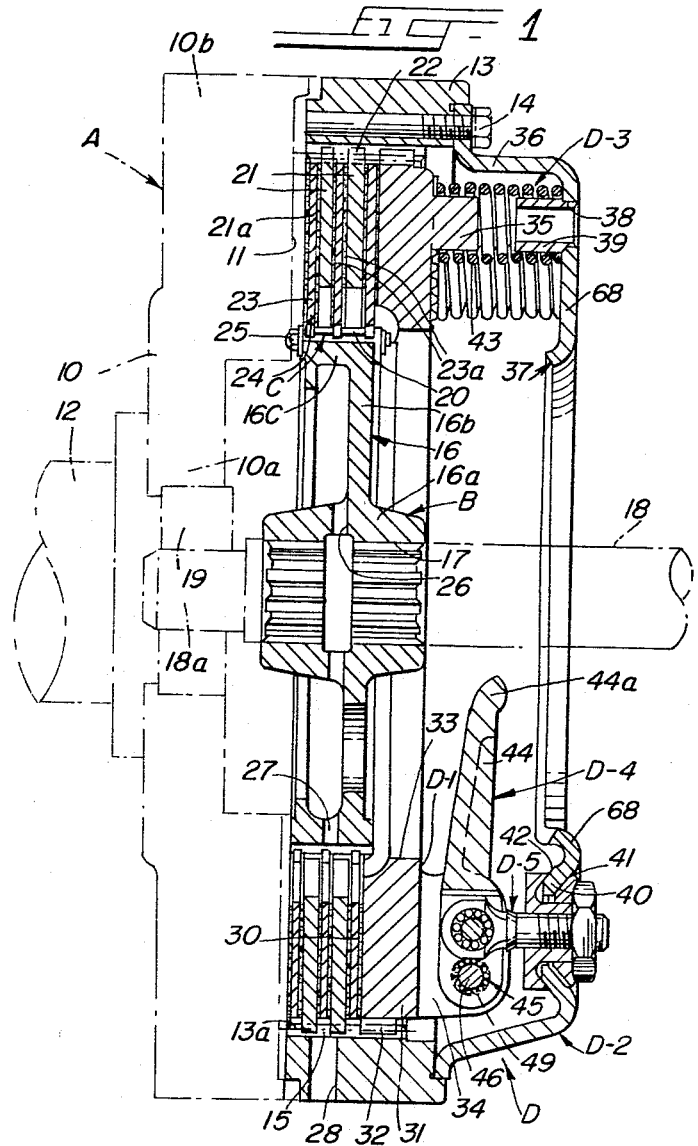
FIGURE 1 is a central sectional view of a friction device incorporating the principles of this invention.

Turning now to the drawings and more particularly to FIGURE 1, there is shown a preferred embodiment of a friction device employing the invention herein. The device broadly comprises rotary input means A, rotary output means B, and an operating assembly D comprising a pressure element D-1 and a sheet metal reaction or cover plate D-2 both drivingly connected to the rotary input means A. A resilient engaging means D-3 is interposed between the reaction plate and pressure element and means D-4 is employed comprising a plurality of levers operatively interconnecting the pressure element and the reaction plate, the levers being effective to exert a dis-engaging force upon said pressure element in opposition to the engaging means. Each of the levers of means D-4 have an outer portion pivotally connected to the pressure element and an intermediate portion pivotally connected to the reaction plate by mounting means D-5 rockably carried by the reaction plate.

Turning now in more particularity to the components thereof, the rotary input means A may comprise an annular flywheel 10 carrying a flat surface 11 effective to cooperate in engaging the friction elements C. The flywheel has a wall forming a central opening and thereby defining its radially inner periphery 10a; the periphery is suitably coupled to the flange portion of an input hub 12 and which is in turn connected to a prime mover (not shown). The annular outer periphery 10b of the flywheel is adapted for carrying a cylindrical drive ring 13 which is locked thereto by axially extending threaded fasteners 14 (fasteners 14 also couple the drive ring to a flanged portion of the reaction plate D-2, as will be described). The interior cylindrical surface 13a of the drive ring has defined therein circumferentially spaced axial splines 15.

The rotary output means B comprises a forged hub 16 having a radially inner sleeve 16a provided with an interior arrangement of axially directed splines 17 effective to drivingly connect with an output shaft 18; the forward end 18a of the output shaft is journalled by a bearing 19 received within the central opening or inner periphery 10a of the flywheel. The hub 16 has a web 16b interconnecting the sleeve 16a and an outer cylindrical flange 16c. The outer surface of the flange 16c has axially directed splines 20 which are circumferentially spaced.

The friction elements C comprise a first plurality of flat annular discs 21 each having an outer periphery provided with splines 22 effective to mate with the splines 15 of the drive ring 13; each of the discs 21 have oppositely facing surfaces 21a effective to operate as frictional engaging faces. A second plurality of flat discs 23 are interleaved between the first plurality of discs 21, each disc 23 has an inner periphery provided with circumferentially defined splines 24 effective to mate with the splines 20 on hub 16. Discs 23 may be provided with friction facing material 23a on opposite sides thereof effective to engage the surfaces 21a of the interleaved disc 21. Axial stops 25 are provided on each side of the hub 16 for limiting the axial freedom of the interleaved discs 21 and 23. Also, radial cooling ports 26 are provided in the sleeve portion 16a of hub 16 for communicating oil, which is forced into the splined connection of the output shaft, so that it may flow by centrifugal force outwardly into the generally aligned ports 27 in the flanged portion 16c of the hub. From there the cooling oil may proceed past the frictional surfaces of the interleaved discs and may exit from the assembly by way om radial ports 28 in the drive ring 13 and thereby may return to a sump (not shown) provided by the clutch housing.

The pressure element D-1 of the operating assembly specifically comprises an annular pressure plate provided with a forwardly facing flat surface 30 effective to engage the interleaved friction elements, the outer periphery 31 of the pressure plate is provided with a plurality of circumferentially spaced splines 32 effective to mate and inter-engage with the splines 15 of the drive ring. The inner periphery of the pressure plate is defined by a central opening 33. The rear portion of the pressure plate has formed thereon equi-circumferentially spaced lugs 34 and circumferentially spaced bosses 35 which cooperate with the engaging means D-3.

The reaction plate D-3 comprises a sheet metal member serving both as a cover and as a reaction for the operating assembly; the reaction plate has an annular rear body 68 generally flat and axially spaced from the pressure element. A stepped annular flange 36 is formed on the body 68 and is received by the fasteners 14 for a driving rotative connection to the ring 13. The body 68 has central opening 37 defining its inner periphery and a plurality of circumferentially spaced openings 38 are formed therein effective to receive cylindrical ferrule 39 cooperating with the engaging means D-3. Also, deformations 40 are formed in general alignment with the lugs of the pressure element, each deformation having opposite surfaces 41 and 42.

The engaging means D-3 may comprise a plurality of coiled compression springs 43 each having one end journalled by a boss 35 of the pressure plate and an opposite end journalled by a ferrule 39 carried by the reaction plate. Springs 43 are effective to normally urge the pressure element to clamp the friction discs for providing conjoint rotation of the input and output means.

Figure 2:
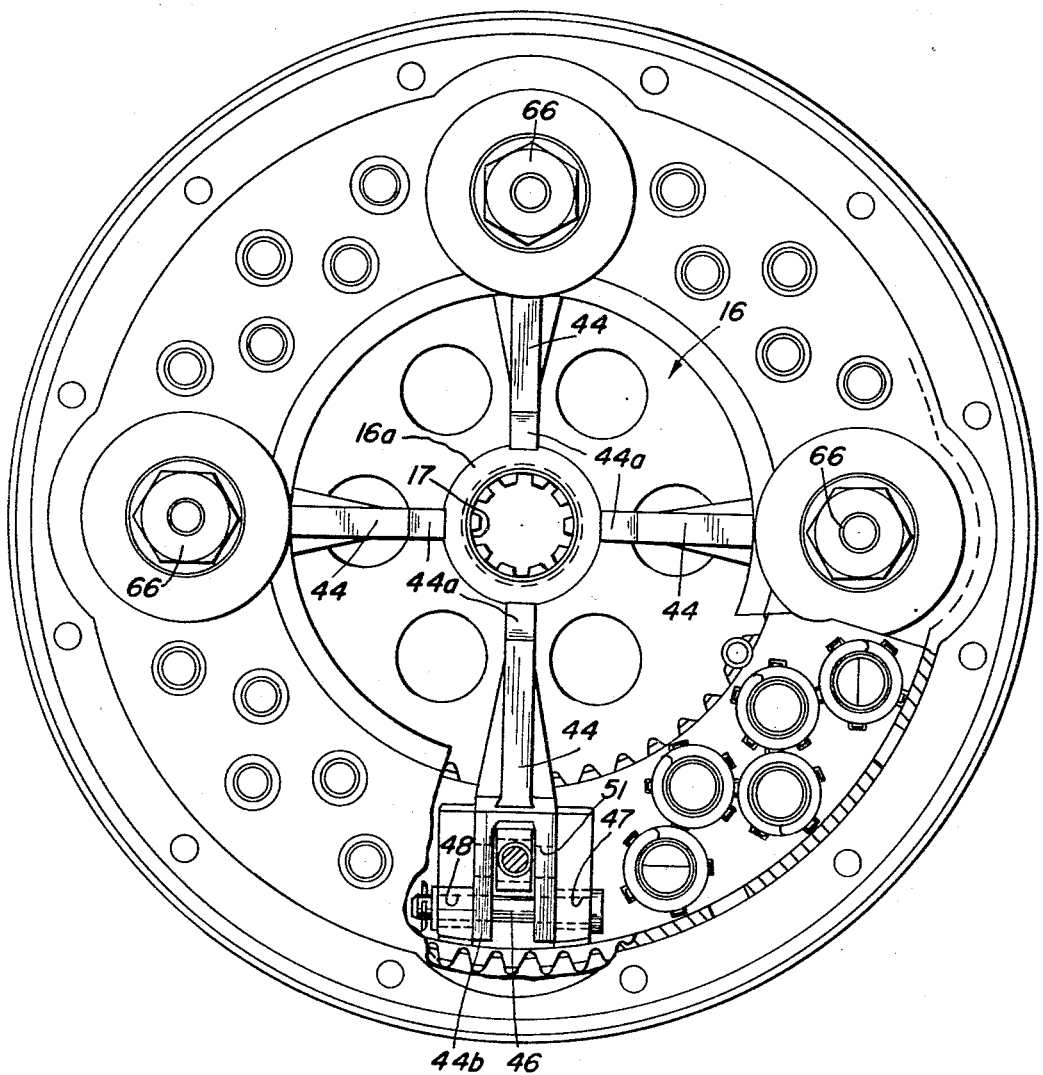
FIGURE 2 is a side-elevational view, with certain portions broken away, of the structure illustrated in FIGURE 1.

The lever system D-4 comprises a plurality of radially directed levers 44 each having an inner end 44a adapted to receive a dis-engaging thrust force from such means (not shown) as an axially sliding thrust bearing movable in a direction to the left as viewed in FIGURE 1. Each lever has an outer forked portion 44b (see FIGURE 2). Levers are interconnected with the pressure element by a first pivotal connection 45 (or first bearing means) which particularly comprises a cylindrical pin 46 disposed chordally with respect to the clutch and has an outer end journalled in aligned openings 47 provided in the laterally spaced ears of the lugs 34. The outer surface of pin 46 serves as an inner race for the bearing and the walls defining aligned openings 48 (which are radially outermost) in the forked portion 44b serve as the outer race. A plurality of roller bearings 49 are circumferentially disposed between the races to complete the pivotal or bearing connection.

A radially innermost part of the forked portion 44b is connected to the reaction plate to serve as a fulcrum. For this purpose, a second pivotal connection (or bearing means) 50 is provided comprising a pair of aligned openings 51 in the forked portions 44b journalling a transverse pin 52 effective to serve as an inner race for the bearing. An opening 53 is defined in the link of the mounting means D-5 and receives pin 52 therethrough. Suitable roller bearings 54 are circumferentially spaced between the wall of opening 53 (serving as the outer race) and the pin inner race to complete the bearing.

To promote the anti-friction characteristics of the roller bearings 45 and 50, they must be capable of circulating about the common fixed axis of the race. However, since the axis of such bearings are fixed relative to the levers 44 some means must be provided for freeing one of the races while the levers are pivoted. To this end, the mounting means D-5 is provided to insure a rockable link connection between the cover plate and the lever to enable the lever to undergo a slight compound movement while it is being pivoted to disengage the pressure element. Means D-5 particularly comprise a link 56 in a form of a threaded eye-bolt; one end 56a is provided with opening wall 53 serving as the outer race of the bearings 50, the other end of the bolt 56 is threaded and extends to the central opening 57 defined in each of the deformations 40 of the reaction plate.

Complementary shaped male and female elements are provided to define a rockable connection between the reaction plate and end 56b of the link 56. The male element 60 is bi-partite and comprises a portion 60a having a cylindrical neck 61 adapted to fit about the threaded portion of the link; an annular flange 62 extends outwardly therefrom carrying a surface 62a which is effective to engage and mate with surface 42 of the reaction plate deformation. The other portion 60b of the male element comprises an annular ring carrying a surface 63 effective to mate with the other side 41 of the reaction plate deformation. Portions 60a and 60b are inter-screwed by threaded means 64 to provide a snug contact between the several surfaces 62a, 63, 42, and 41. A threaded stop 66 is mounted outwardly of the reaction plate on the threaded end 56b of the link and is effective to be adjusted for moving the bolt axially and thereby positioning the center of the eye-bolt openings 53 for determining the proper fulcrum of the levers. This stop may be adjusted at any time during use of the device so that wear of frictional faces may be compensated.

The shape of surfaces 62a, 63, 42, and 41 must take a shape effective to define a rockable connection. In the preferred embodiment the surfaces are generally a segment of a spherical configuration. However, other embodiments may have the radius of curvature gradually changing so that each surface is a progression of spherical segments. The shape is determined by the geometry necessary for providing the proper freedom to rock for link 56. The necessity for the rockable connection can be appreciated by viewing FIGURE 3 where it can be seen that a pure pivoting motion of the lever about a rigid eye-bolt (one which is not capable of rocking) the center of the first pivotal connection or bearing means 45 moves slightly radially inwardly as well as rearwardly to accommodate the general arcuate movement of the forked portion of the lever. However, since the pressure plate is restricted to solely axial movement, the center of the bearing means 45 is also constrained to move back in a straight axial direction. The fulcrum of the lever must be free to shift to accommodate the straight rearward movement of the pressure plate as the inner ends of the levers are actuated. To aid in reducing locking of the interengaged surfaces, an insert 67 may be employed having a shape to nest between surfaces 63 and 41; preferably the insert may be fabricated from Teflon or an equivalent anti-friction material.

While I have described my invention in connection with one specific embodiment and other alternative suggestions thereof, it is understood that this is by way of

I claim:

1. For use in a friction device having rotary input and output means with friction elements operative between an inter-engaged condition for providing selective conjoint rotation of said input and output means and a disengaged condition, an operating assembly, comprising: a pressure element drivingly associated with said input means and movable in one direction for promoting interengagement of said friction elements, a reaction plate also drivingly associated with said input means, and means interconnecting said pressure element and reaction plate and operable to urge said pressure element in a direction for promoting one of said conditions of said friction elements, said means comprising at least one lever having a bearing providing a pivotal connection between said pressure element and lever about an axis which is fixed relative to each thereof, and a second bearing providing a pivotal connection between said lever and reaction plate effective to permit said lever to nutate relative to said reaction plate during operation, said second bearing comprises a link rockably connected with said cover plate, said cover plate having at least one socket defined therein and said link carrying a male element shaped as a complement to said socket, each link having a stop carried thereon for urging said male element in to engagement with said socket and thereby completing said rockable connection, said cover plate is formed from sheet metal and each of said sockets comprise a semi-spherical deformation therein, said male element having spaced semi-spherical flanges carrying semi-spherical surfaces effective to mate in a complementary matter with opposite sides of said deformations, and said stop comprising a member threadably carried by said link at one side of said male elements.

2. An operating assembly as in claim 1, in which said male element is bi-partite wherein each of said flanges are on different portions of said male element, said parts being inter-screwed for rigid connection.

3. A clutch device comprising: rotative input and output means, means for providing selective conjoint rotation of said input and output means and including a pressure element and cover plate each drivingly associated with said input means, means normally urging said pressure element in one direction to provide said conjoint rotation, and a lever system inter-connecting said pressure element and cover plate for providing selective dis-engagement of said pressure element, said lever system comprising a plurality of radially directed levers each having a forked outer portion with radially spaced pairs of cylindrical bores therein, said pressure element having a pair of lugs extending outwardly therefrom and between which the forked portion of a lever is disposed, said pressure element lugs having a pair of aligned bores therein effective to align with one pair of bores in said lever, and receive a first pin therethrough, a second pin received in the other pair of bores of said lever, a rockable link interconnecting said second pin and said cover plate for providing a pivotal reaction with said lever to dis-engage said input and output means, said link being rockably connected to said cover plate by complementary shaped male and female portions, said famale portion being defined by a semi-spherical deformation in said cover plate and said male portion having a first portion provided with a semi-spherical surface effective to engage one side of said socket, and a second portion of said male element having a semispherical surface effective to engage the opposite side of said socket said portions being inter-screwed and carried by said link.

4. A friction clutch having a plurality of stacked friction plates adapted to be clamped between a flywheel and a pressure plate by springs acting between the pressure plate and a sheet metal cover plate secured to the flywheel, certain of the inter-leaved friction plates and said pressure plate being jointly connected to the flywheel by a plurality of complementary formed axially directed splines on each thereof, a plurality of radially directed release levers each having a forked outer portion between which is received a pin pivotally received in lugs extending from said pressure plate, each of said levers further having a second pin carried solely by said lever and having a rockable link pivotally connected to said second pin, said rockable link having an opposite end connected to said cover plate for rockable movement relative to said cover plate, said rockable connection is provided by at least one irregular deformation formed in said cover plate with opposite surfaces of said deformation being complementary, said link carrying at least one stop having a surface effective to mate with one of said irregular surfaces of said deformation and thereby provide reaction for the pivotal movement of said lever, said rockable connection further comprises a relatively thin anti-friction insert formed as a hollow irregular nose effective to be interposed between said surfaces of said male and socket portions.

5. A friction clutch as in claim 4, in which said insert is comprised of Teflon material.

References Cited
UNITED STATES PATENTS

| | | | |
|---|---|---|---|
| 2,029,187 | 1/1936 | Pfeiffer | 192—99 X |
| 2,453,344 | 11/1948 | Root | 192—99 |
| 2,773,576 | 12/1956 | Stenger | 192—99 X |
| 3,162,284 | 12/1964 | Montgomery | 192—69 |

MARK NEWMAN, *Primary Examiner.*

A. T. McKEON, *Examiner.*